United States Patent
Uhlmann

(10) Patent No.: US 6,895,215 B2
(45) Date of Patent: May 17, 2005

(54) METHOD AND APPARATUS FOR TRANSFERRING CORRESPONDENCE INFORMATION

(75) Inventor: Gregory John Uhlmann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 847 days.

(21) Appl. No.: 09/750,259

(22) Filed: Dec. 28, 2000

(65) Prior Publication Data

US 2002/0087651 A1 Jul. 4, 2002

(51) Int. Cl.[7] .............. H04H 1/00; H04M 1/00; G06F 15/173
(52) U.S. Cl. .............. 455/3.01; 455/73; 455/556.2; 709/225
(58) Field of Search ................ 709/203, 225; 455/3.01, 556.2, 73

(56) References Cited

U.S. PATENT DOCUMENTS

| | | | | |
|---|---|---|---|---|
| 5,497,339 A | * | 3/1996 | Bernard | 708/109 |
| 5,704,029 A | * | 12/1997 | Wright, Jr. | 715/505 |
| 5,742,668 A | * | 4/1998 | Pepe et al. | 455/415 |
| 6,094,681 A | * | 7/2000 | Shaffer et al. | 709/224 |
| 6,198,941 B1 | * | 3/2001 | Aho et al. | 455/552.1 |
| 6,343,318 B1 | * | 1/2002 | Hawkins et al. | 709/219 |
| 6,434,403 B1 | * | 8/2002 | Ausems et al. | 455/556.2 |
| 6,437,836 B1 | * | 8/2002 | Huang et al. | 348/734 |
| 6,711,154 B1 | * | 3/2004 | O'Neal | 370/352 |
| 2001/0035861 A1 | * | 11/2001 | Ericson et al. | 345/179 |
| 2002/0026474 A1 | * | 2/2002 | Wang et al. | 709/203 |

* cited by examiner

Primary Examiner—Krisna Lim
(74) Attorney, Agent, or Firm—Moser Patterson & Sheridan LLP

(57) ABSTRACT

A method and apparatus for providing correspondence information to a personal digital assistant (PDA) device. Examples of such correspondence information include business card information and calendar appointment information. The correspondence information is retrieved from a memory, translated into a format utilized by an operating system of the PDA device, and transmitted to the PDA device.

20 Claims, 3 Drawing Sheets

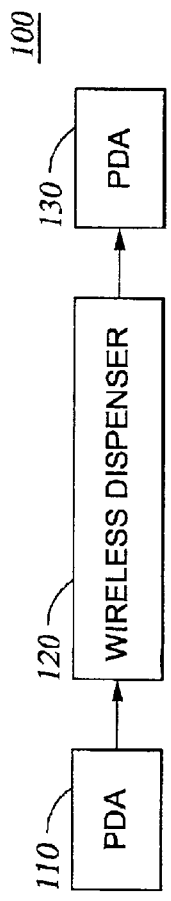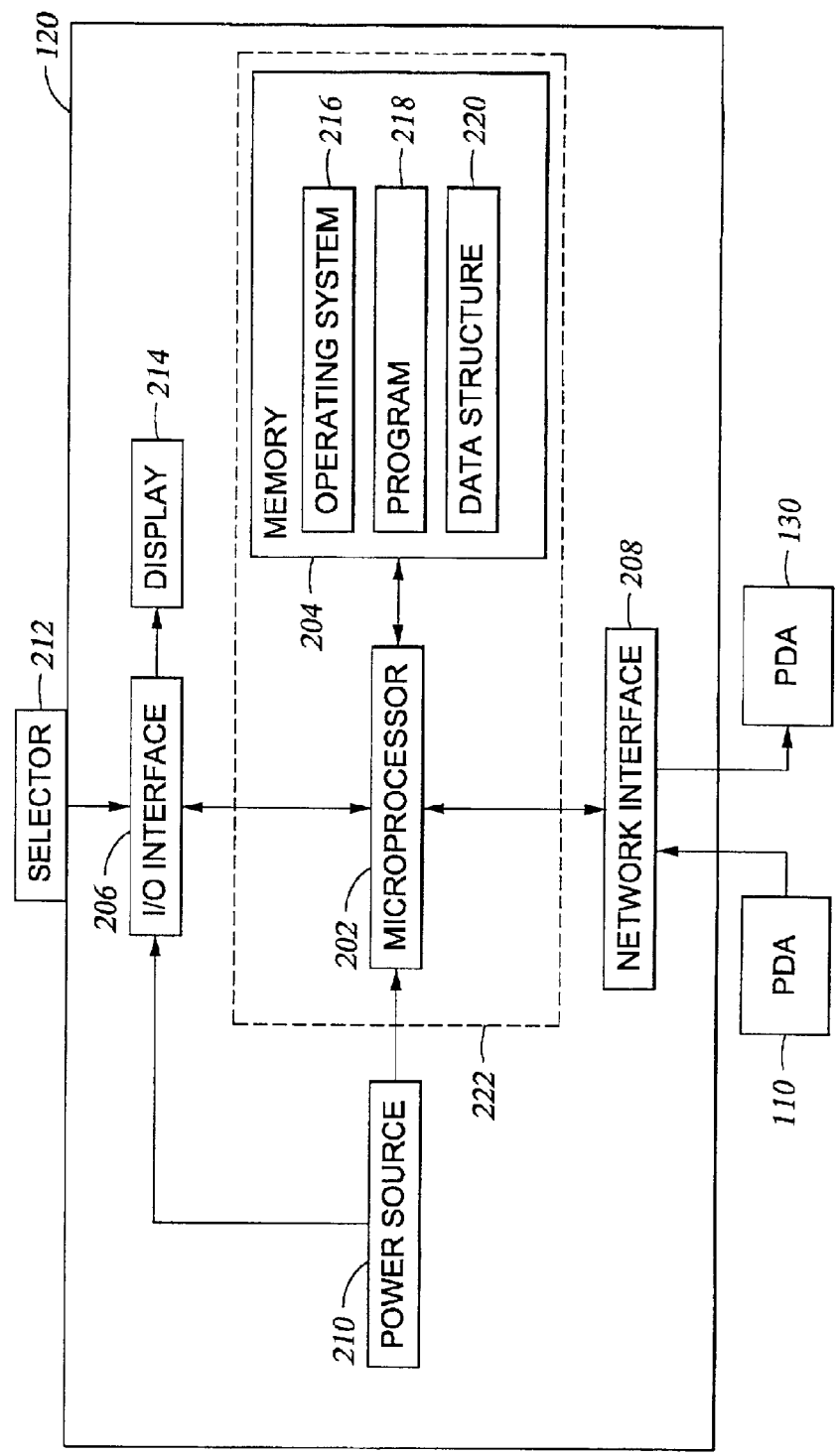

METHOD AND APPARATUS FOR TRANSFERRING CORRESPONDENCE INFORMATION

BACKGROUND OF THE INVENTION

1. Field of the Invention

The invention relates to data storage and data transmission. More particularly, the invention relates to a method and apparatus for performing a wireless transmission of correspondence information to personal digital assistant (PDA) devices.

2. Background of the Related Art

The personal digital assistant (PDA) device is a popular hand held, computer-controlled device capable of a variety of features. PDA devices enable users to store important information, play games, send electronic mail (e-mail) and perform word processing applications. Examples of such important information include phone numbers, business addresses, e-mail addresses, personal notes, business card information and appointment information.

The PDA device is particularly convenient for storing information in business settings. For example, a user may wish to enter correspondence information with many business contacts. In this situation, the user is required to manually enter the business card correspondence information, e.g., name, phone number and business address on business cards, into the PDA device. Alternatively, the user may obtain this information by synching or synchronizing the PDA device with another PDA device.

However, such synchronization requires that both PDA devices use the same operating system. As such, information transfer is generally limited between PDA devices using the same operating system. Additionally, the PDA device remains too expensive for many consumers. Thus, there exists a need for an alternative inexpensive device that performs wireless transmission of correspondence information with different types of existing PDA devices.

SUMMARY OF THE INVENTION

The invention provides a method and apparatus for providing correspondence information to a personal digital assistant (PDA). Specifically, the method comprises retrieving correspondence information from a memory, translating the correspondence information into a format utilized by an operating system of the PDA device, and transmitting the correspondence information to the PDA device via a wireless channel.

In another embodiment of the invention, an apparatus comprising a translator and an interface port is provided. The translator is configured to retrieve and translate correspondence information into a format utilized by an operating system of a PDA device. The interface port transmits the correspondence information to the PDA device via a wireless channel.

A hand held device comprising a memory, a processor, an input/output device and a power source is also provided. The memory contains information consisting of business card information, calendar appointment information and at least one operating system. The processor is configured to access the information contained in the memory, the input/output device is configured to transmit information to and receive information from a wireless channel, and the power source is configured to supply power to at least the processor.

BRIEF DESCRIPTION OF THE DRAWINGS

The teachings of the present invention can be readily understood by considering the following detailed description in conjunction with the accompanying drawings, in which:

FIG. 1 depicts a high level block diagram of a data transfer system utilized in the present invention;

FIG. 2 depicts a block diagram of a wireless device in accordance with the present invention;

To facilitate understanding, identical reference numerals have been used, where possible, to designate identical elements that are common to the figures.

DETAILED DESCRIPTION OF THE PREFERRED EMBODIMENT

Figure 3:
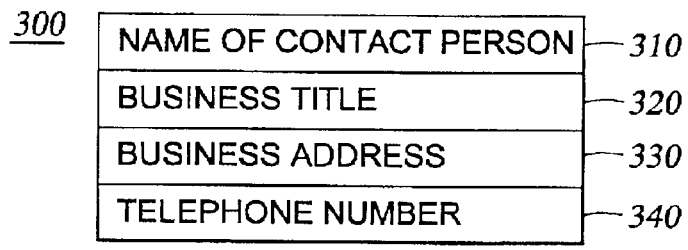
FIG. 3 depicts a data structure utilized for providing business card information.

The invention provides a method and apparatus for providing correspondence information to a personal digital assistant (PDA) device. Examples of such correspondence information include business card information and calendar appointment information. The correspondence information is retrieved from a memory, translated into a format utilized by an operating system of the PDA device, and transmitted to the PDA device.

In one embodiment, the apparatus is a wireless dispenser for performing wireless transmission of correspondence information to the PDA device. The wireless dispenser may also perform a wireless reception of the correspondence information. By performing such wireless transmission and reception between PDA devices, the wireless dispenser is not concerned with other aspects of the PDA device, e.g., games, electronic mail (e-mail) and word processing. As such, the wireless dispenser represents an inexpensive alternative to conventional PDA devices for transmitting and receiving correspondence information between different types of PDA devices. Additionally, the wireless dispenser also achieves a significantly scaled down device in comparison to PDA devices that support a variety of computing features.

FIG. 1 depicts a data transfer system 100 illustratively utilized in accordance with the invention. The data transfer system 100 illustratively comprises a transmitting personal digital assistant (PDA) device 110, a wireless dispenser 120, and a receiving PDA device 130. The transmitting PDA device 110 is configured to transmit correspondence information to the wireless dispenser 120, while the receiving PDA device 130 is configured to receive correspondence information from the wireless dispenser 120. Examples of correspondence information include business card information, calendar appointment information and the like.

In one embodiment of the invention, the wireless dispenser 120 transmits previously stored correspondence information to the receiving PDA device 130. In another embodiment of the invention, the wireless dispenser 120 receives correspondence information from the transmitting PDA device 110 and then transmits the received correspondence information to the receiving PDA device 130. Wireless, e.g., infrared, transmission of correspondence information occurs between the wireless dispenser 120, the transmitting PDA device 110 and the receiving PDA device 130. However, the wireless dispenser 120 may also receive correspondence information from any other type computer-controlled device, e.g., a personal computer. Thus, the transmission of information between the wireless dispenser 120 and such computer-controlled device may use a serial connection, e.g., a cable.

The transmitting PDA device 110 and the receiving PDA device 130 are hand-held, computer-controlled devices capable of transmitting and receiving different types of data. The transmitting PDA device 110 and the receiving PDA device 130 may comprise commercially available PDA devices such as the 3Com Palm, the Casio Casiopeia and the Hewlett Packard Jornada. The PDA devices 110 and 130 may use different operating systems such the Palm Pilot™, the Windows CE™ and the Handspring Visor™.

Each PDA device 110 and 130 may run different types of applications based upon the demands of an operating system. Common examples of PDA operating systems include the 3Com Palm, the Microsoft Windows CE, and the Microsoft Pocket PC. The operating system also determines the format of data files in the PDA device transferred between the wireless dispenser 120 and the PDA devices 110 and 130. The operating system also controls the synchronization of the transmitting PDA device 110 and the receiving PDA device 130 with the wireless dispenser 120 prior to any transfer of correspondence information.

The wireless dispenser 120 is a portable computer controlled module specifically configured to transfer, e.g., receive and transmit, correspondence information between different types of PDA devices 110 and 130. As these PDA devices 110 and 130 may utilize different operating systems and correspondingly different data formats, the wireless dispenser 120 may convert the correspondence information received from the input or transmitting PDA device 110 into a common format for storage. The operating system utilized by the wireless dispenser 120 dictates the format of the converted correspondence information. The wireless dispenser 120 may also convert the correspondence information into a format suitable for the output or receiving PDA device 130.

The wireless dispenser 120 represents a cheap or inexpensive alternative to transfer correspondence information between different PDA devices 110 and 130. To implement this limited function, the wireless dispenser 120 primarily contains components for transferring correspondence information between PDA devices. As such, the wireless dispenser 120 does not provide other capabilities of PDA devices, e.g., games, electronic mail (e-mail) services, address books and word processing applications.

FIG. 2 depicts the block diagram of the wireless dispenser 120 utilized in accordance to the present invention. Specifically, the wireless dispenser 120 comprises a microprocessor 202, a memory 204, a network interface 206 and an input/output (I/O) interface 208 and a power source 210. The wireless dispenser 120 may also include a selector 212 and a display 214.

The microprocessor 202 receives instructions from the memory 204 and performs operations based upon the requirements of the operating system 214 and a wireless data transfer program 218. The microprocessor 202 executes the program 218 to implement the embodiments of the present invention. In one embodiment, the microprocessor 202 transmits previously stored correspondence information from the memory 204 to the receiving PDA device 130. In another embodiment, the microprocessor 202 stores correspondence information from the transmitting PDA device 110 in the memory 204 and then transmits the correspondence information from the memory 204 to the receiving PDA device 130. Correspondence information is represented in the memory 204 as data structures 220.

The microprocessor 202 may receive and transmit correspondence to different types of PDA devices. To transfer correspondence data between these different PDA devices, the microprocessor 202 needs to convert the received correspondence information into a common data format and convert the stored correspondence information into a format suitable for the output PDA device 130. When utilized to convert the received or stored correspondence information, the combination of the microprocessor 202 and the memory 204 operates as a format translator 222.

The memory 204 contains the necessary data and programming structures necessary for the operation of the wireless dispenser 120. Illustratively, the memory 204 includes an operating system 216, a wireless data transfer program 218 and data structures 220. The memory 204 comprises a random access memory (RAM) and optionally nonvolatile or backup memory (e.g., electronic programmable read only memories (EPROM), flash memories, and the like). The operating system 216 and the program 218 are specifically configured for implementing the wireless data reception and transfer in the present invention. The data structures 204 include correspondence information such as business card information and appointment information. Exemplary data formats of business card and appointment information are further described with respect to FIGS. 3–4.

The I/O interface 206 comprises a controller to couple the selector 212 and the display 214 to the microprocessor 202. A user initially activates the selector 212 to select a type of PDA device 130, as defined by its operating system, for receiving correspondence information. Additionally, the selector 212 may be used to activate the receipt of correspondence information into the wireless dispenser 120, to retrieve correspondence information from the memory 204, or transmit correspondence information to the receiving PDA device 130. Examples of the selector 212 include a push button, a switch, and the like. Any retrieved or received correspondence information may be indicated on the display 214 prior to transmission In one embodiment, the network interface 208 comprises an infrared port to couple the microprocessor 202 to the transmitting PDA device 110 and the receiving PDA device 130. The infrared port is utilized to synchronize the wireless dispenser 120 to the operating system of the transmitting PDA device 110 or the receiving PDA device 130. For example, synchronization between the wireless dispenser 120 and the transmitting PDA device 110 occurs after the user activates the selector 212 and the wireless dispenser 120 is placed within a relatively short, threshold distance from the transmitting PDA device 110. Once the wireless dispenser 110 is synchronized with the operating system of the transmitting PDA device 110, correspondence information is transferred from the transmitting PDA device 110 to the wireless dispenser 120. Similarly, the wireless dispenser 120 must synchronize with the operating system of the receiving PDA device 130 prior to sending correspondence information to that PDA device 130.

The power source 210 is coupled to the microprocessor 202 and the I/O interface 206 to provide power for the wireless dispenser 120. The power source 210 is illustratively shown as an independent source, e.g., a battery. However, the power source 210 may be external to the wireless dispenser 120, e.g., connected to a wall outlet.

FIG. 3 depicts a data structure 300 utilized for providing business card information. The data structure 300 is one embodiment of the data structure 222 received or stored in the memory 204. More specifically, the data structure 300 comprises a name field 310, a business title field 320, a business address field 330 and a contact number field 340. The name field 310 contains the name of the contact person on a business card. Similarly, the business title field 320, the business address field 330 and the contact number respectively contain the title, the business address, and the phone or facsimile number of the person on the business card.

Figure 4:
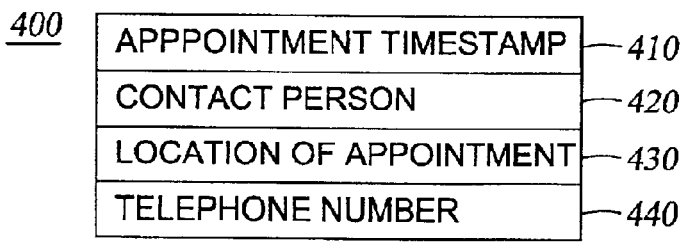
FIG. 4 depicts a data structure utilized for providing appointment information.

FIG. 4 depicts a data structure 400 utilized for providing appointment information. The data structure 400 is another embodiment of the data structure 222 received or stored in the memory 204. More specifically, the data structure 400 comprises a timestamp field 410, a contact person field 420, a location field 430 and a contact number field 440. The timestamp field 410 may contain the data and time of a particular appointment. Similarly, the contact person field 420, the location field 430 and the contact number field 440 may respectively contain the name of the person to meet in the appointment, the location of the appointment, and the telephone or facsimile number of the person.

Figure 5:
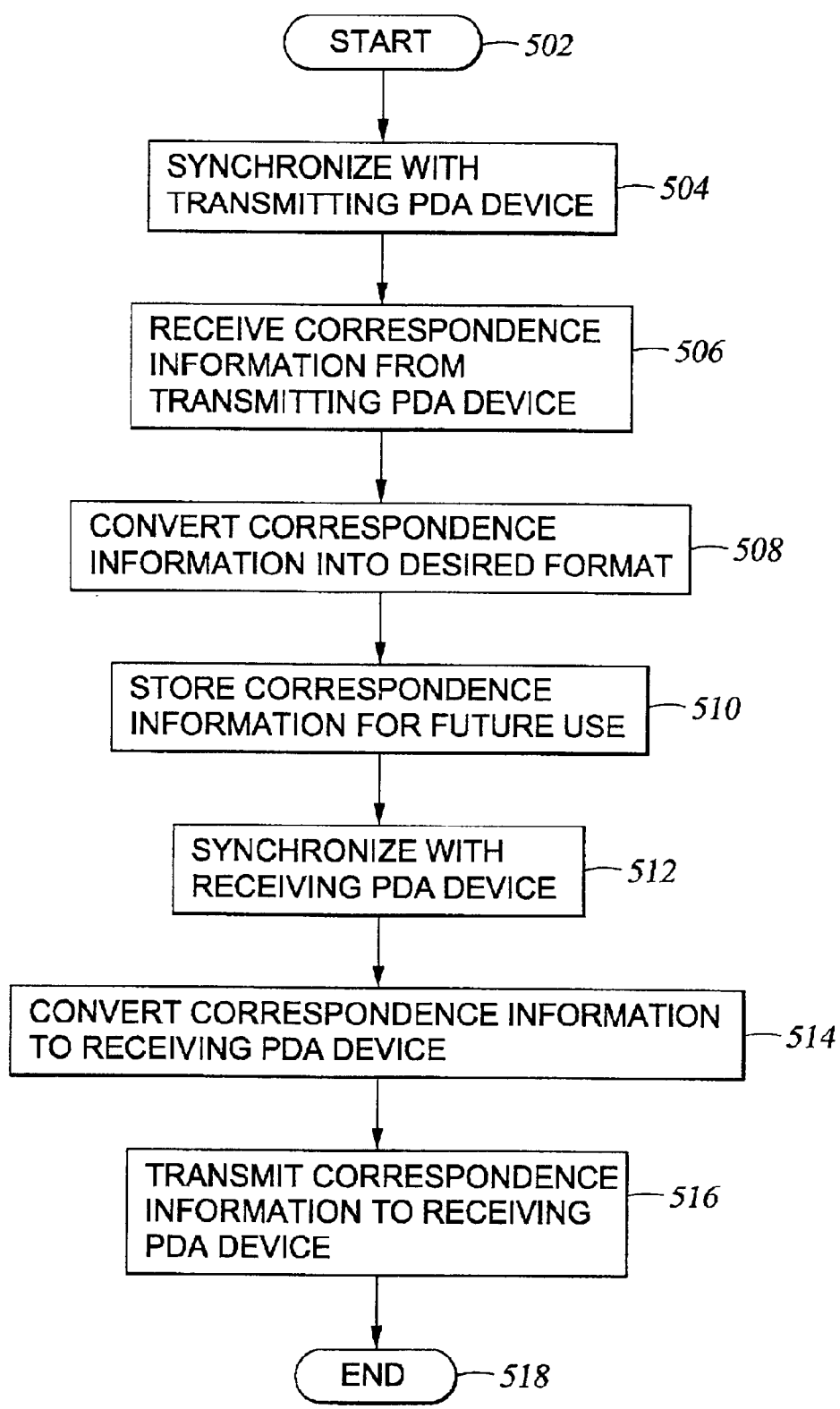
FIG. 5 depicts a flow diagram of a method for operating the wireless device in accordance with one embodiment of the present invention.

FIG. 5 depicts a flow diagram of a method 500 for operating the wireless dispenser 120 in accordance with one embodiment of the present invention. The method 500 starts at step 502 and proceeds to step 504, where synchronization to the input PDA device, e.g., the transmitting PDA device 110, occurs. Synchronization may include determining or verifying the operating system of the transmitting PDA device 110. Synchronization occurs after the selector 212 is activated and the PDA device 110 is placed within a threshold distance of the wireless dispenser. At step 506, the correspondence information is received. The method 500 proceeds to step 508, where the correspondence information is converted or translated into a data format, e.g., a standardized format, utilized by either the operating system 216 and the program 218.

At step 510, the method 500 stores the converted correspondence information as a data structure 220 in the memory 204. In order to transfer correspondence information to an output PDA device, e.g., the receiving PDA device 130, the method 500 proceeds to step 512, where synchronization occurs with the receiving PDA device 130. Synchronization may include determining or verifying the operating system of the receiving PDA device 130 by the wireless dispenser 120. Step 512 occurs after the selector 212 is activated and the PDA device 130 is placed within a threshold distance to the wireless dispenser 120. After synchronizing with the PDA device 130, the method 500 proceeds to step 514, where the stored correspondence information is converted into a format utilized in the operating system of the PDA device 130. The method 500 proceeds to transmit the correspondence information to the PDA device 130 at step 516 and ends at step 518.

Figure 6:
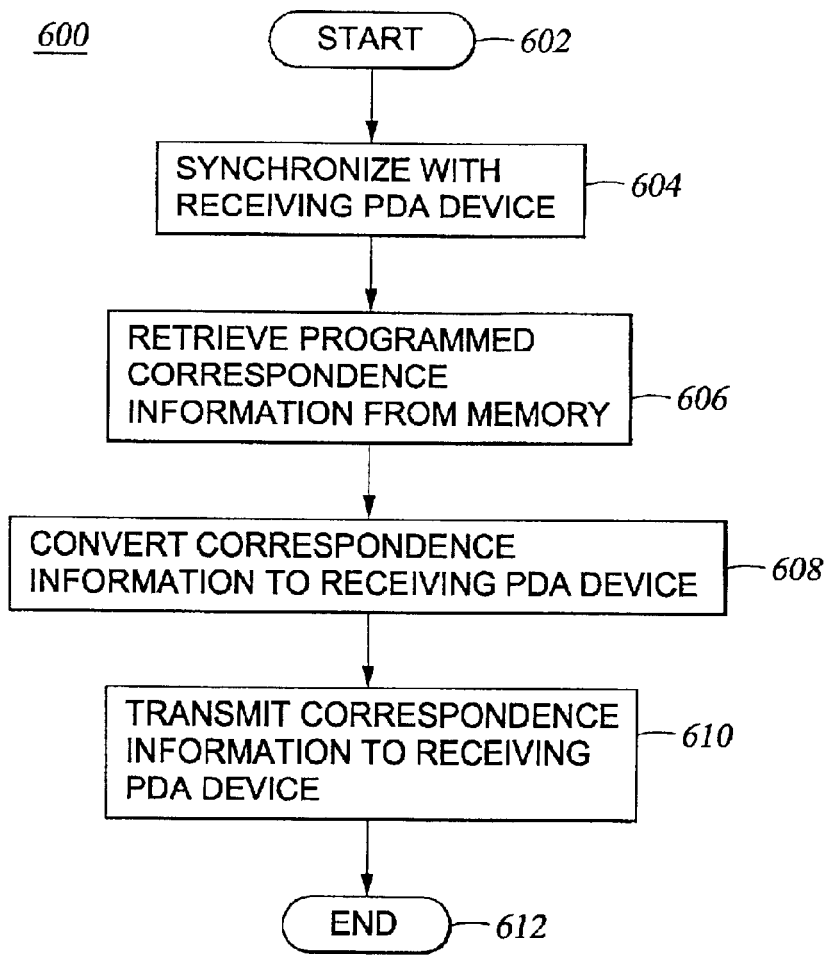
FIG. 6 depicts a flow diagram of a method for operating the wireless device in accordance with another embodiment of the present invention.

FIG. 6 depicts a flow diagram of a method 600 for operating the wireless device in accordance with another embodiment of the present invention. In contrast to the embodiment depicted in FIG. 5, the method 600 is directed to retrieving and transmitting previously stored correspondence information. For example, the correspondence information may be initially stored in memory 204, e.g. an EPROM (electrical programmable read only memory). The method 600 starts at step 602 and proceeds to step 604, where synchronization occurs with the receiving PDA device 130. Synchronization may include determining or verifying the operating system of the receiving PDA device 130 by the wireless dispenser 120. Step 604 occurs after the button 212 is depressed and the PDA device 130 is placed within a threshold distance to the wireless dispenser 120. At step 606, the correspondence information is retrieved from the EPROM 204. The method 600 proceeds to step 608, where the correspondence information is converted into a data format utilized in the operating system of the PDA device 130. After step 608, the method 600 proceeds to transmit the correspondence information to the PDA device 130 at step 610 and ends at step 612.

Although various embodiments which incorporate the teachings of the present invention have been shown and described in detail herein, those skilled in the art can readily devise many other varied embodiments that still incorporate these teachings.

What is claimed is:

1. A method for providing correspondence information to a personal digital assistant (PDA) device from a handheld device wherein the handheld device is a specific-purpose device having functionality limited essentially to communicating correspondence information between other devices proximate to the handheld device, the method comprising:

retrieving, by the handheld device, the correspondence information from a memory of the handheld device;

translating, by the handheld device, the correspondence information into a format utilized by an operating system of the PDA device; and transmitting, by the handheld device, the translated correspondence information to the PDA device via a wireless channel established directly between the handheld device and the PDA device.

2. The method of claim 1 further comprising:

verifying the operating system of the PDA device in response to an input command indicative of a type of PDA device.

3. The method of claim 1 further comprising:

receiving correspondence information from a second PDA device;

translating the received correspondence information into a standardized format; and storing the translated and received correspondence information into the memory.

4. The method of claim 1 wherein the correspondence information is programmed into the memory.

5. The method of claim 1 wherein the correspondence information comprises at least one of business card information and calendar appointment information.

6. The method of claim 5 wherein the business card information comprises at least one of a name of a person, an address, a telephone number and a title of the person.

7. The method of claim 5 wherein the calendar appointment information comprises at least one of an appointment time, a location of the appointment, a telephone number, and a name of a person.

8. The method of claim 1 wherein the wireless channel comprises an infrared signal path.

9. The method of claim 1 wherein the translating of the correspondence information is different for different types of PDA devices.

10. An apparatus for providing correspondence information to a personal digital assistant (PDA) device, the apparatus comprising:

a translator, configured to retrieve correspondence information and translate the retrieved correspondence information into a format utilized by an operating system of the PDA device; and an interface port for transmitting the correspondence information to the PDA device via a wireless channel established directly between the interface port and the PDA device, wherein the apparatus is a handheld device having functionality limited essentially to communicating correspondence information between other devices proximate to the handheld device.

11. The apparatus of claim 10 wherein the translator comprises:
   a memory for storing a data translating program; and
   a microprocessor, coupled to the memory, for translating the correspondence information upon executing the data translating program.

12. The apparatus of claim 10 wherein the translator verifies the operating system of the PDA device prior to retrieving correspondence information.

13. The apparatus of claim 10 further comprising:
   a selector, coupled to the translator, configured for providing an input command to initiate the translator.

14. The apparatus of claim 10 further comprising an electrical programmable read only memory (EPROM).

15. A hand held device, comprising:
   a memory containing contents comprising (i) information consisting of business card information and calendar appointment information, and (ii) at least one operating system;
   a processor configured to access the information and execute the operating system;
   an input/output device configured to transmit the information to and receive the information from a wireless channel established directly between the input/output device end at least one proximate portable device; and
   a power source configured to supply power to at least the processor, wherein the hand held device has functionality limited essentially to communicating the correspondence information between other portable devices proximate to the hand held device.

16. The hand held device of claim 15 wherein the contents further consists of a translator program configured to translate the business card information and calendar appointment information into a format usable by another operating system.

17. The hand held device of claim 15 wherein the at least one operating system comprises a plurality of operating systems.

18. A data transfer system, the system comprising:
   a first personal digital assistant (PDA) device configured to receive correspondence information; and
   a data dispenser, wherein the data dispenser is a specific-purpose device having functionality limited essentially to communicating correspondence information to other devices proximate to the data dispenser, including the first PDA device, the data dispenser comprising:
      a translator configured to retrieve correspondence information in a first format and translate the retrieved correspondence information into a second format utilized by an operating system of the first PDA device; and
      an interface port, for transmitting the correspondence information to the first PDA device via a wireless channel established directly between the interface port and the first PDA device.

19. The data transfer system of claim 18 further comprising:
   a computer-controlled device, configured to provide correspondence information to the data dispenser, where the data dispenser is further configured to receive correspondence information from the computer-controlled device, the interface port further receives correspondence information from the computer-controlled device, and the translator further translates the received correspondence information into a standardized format for storage in the memory.

20. The data transfer system of claim 19 wherein the computer-controlled device comprises one of a personal computer and a second PDA device.

* * * * *

UNITED STATES PATENT AND TRADEMARK OFFICE
CERTIFICATE OF CORRECTION

PATENT NO. : 6,895,215 B2
DATED : May 17, 2005
INVENTOR(S) : Gregory John Uhlmann It is certified that error appears in the above-identified patent and that said Letters Patent is hereby corrected as shown below:

Column 7,
Line 30, "end" should be -- and --.

Signed and Sealed this

Nineteenth Day of July, 2005

JON W. DUDAS
*Director of the United States Patent and Trademark Office*